US011815966B2

(12) United States Patent
Hanes et al.

(10) Patent No.: US 11,815,966 B2
(45) Date of Patent: Nov. 14, 2023

(54) HEAD MOUNTED TEMPERATURE CONTROLLED UNITS

(71) Applicant: Hewlett-Packard Development Company, L.P., Spring, TX (US)

(72) Inventors: David H. Hanes, Fort Collins, CO (US); Jon R. Dory, Spring, TX (US); Matthew Flach, Fort Collins, CO (US)

(73) Assignee: Hewlett-Packard Development Company, L.P., Spring, TX (US)

(*) Notice: Subject to any disclaimer, the term of this patent is extended or adjusted under 35 U.S.C. 154(b) by 515 days.

(21) Appl. No.: 17/045,519

(22) PCT Filed: Aug. 30, 2018

(86) PCT No.: PCT/US2018/048766
§ 371 (c)(1),
(2) Date: Oct. 6, 2020

(87) PCT Pub. No.: WO2020/046320
PCT Pub. Date: Mar. 5, 2020

(65) Prior Publication Data
US 2021/0365090 A1 Nov. 25, 2021

(51) Int. Cl.
*G06F 1/20* (2006.01)
*H04R 1/10* (2006.01)

(52) U.S. Cl.
CPC .......... *G06F 1/206* (2013.01); *H04R 1/1008* (2013.01); *H04R 1/1091* (2013.01)

(58) Field of Classification Search
CPC ...... G06F 1/206; H04R 1/1008; H04R 1/1091

USPC .......................................................... 381/74
See application file for complete search history.

(56) References Cited

U.S. PATENT DOCUMENTS

| | | | |
|---|---|---|---|
| 6,860,431 B2 | 3/2005 | Jayadev | |
| 8,156,570 B1 | 4/2012 | Hockaday | |
| 9,488,565 B2 | 11/2016 | Zielinski et al. | |
| 9,942,647 B2 | 4/2018 | Di Censo et al. | |
| 10,261,555 B1 | 4/2019 | Cooper et al. | |
| 2008/0066476 A1 | 3/2008 | Zhu et al. | |
| 2009/0274317 A1 | 11/2009 | Kahn et al. | |
| 2010/0050658 A1 | 3/2010 | Ali | |
| 2010/0217099 A1 | 8/2010 | Leboeuf et al. | |
| 2011/0013780 A1 | 1/2011 | Yamkovoy | |
| 2011/0078845 A1* | 4/2011 | McKinney | A42B 3/285 2/422 |
| 2011/0268290 A1 | 11/2011 | Lee | |
| 2015/0358712 A1 | 12/2015 | Ji | |

(Continued)

FOREIGN PATENT DOCUMENTS

| | | |
|---|---|---|
| CN | 101287300 A | 10/2008 |
| CN | 201156817 Y | 11/2008 |

(Continued)

*Primary Examiner* — Sean H Nguyen
(74) *Attorney, Agent, or Firm* — Quarles & Brady LLP

(57) ABSTRACT

In an example implementation according to aspects of the present disclosure, a method may include receiving a temperature reading from a sensor coupled to the head mounted unit. A delta may be calculated based on the temperature reading and a predetermined temperature. A thermo-electric cooling device may be activated based on the delta surpassing a threshold. The thermo-electric cooling device utilizes thermally conductive plates, padding and fabric to transfer thermal energy.

15 Claims, 7 Drawing Sheets

(56) References Cited

U.S. PATENT DOCUMENTS

| | | |
|---|---|---|
| 2016/0050479 A1 | 2/2016 | Anderson |
| 2016/0337745 A1 | 11/2016 | Adams |
| 2016/0374411 A1 | 12/2016 | Brooks et al. |
| 2017/0056240 A1* | 3/2017 | D'Ambrosio ............. A61F 7/12 |
| 2017/0099539 A1 | 4/2017 | Di et al. |
| 2018/0220219 A1 | 8/2018 | Karacal |
| 2021/0204051 A1 | 7/2021 | Hanes et al. |

FOREIGN PATENT DOCUMENTS

| | | |
|---|---|---|
| CN | 101494811 A | 7/2009 |
| CN | 203618103 U | 5/2014 |
| CN | 104244129 A | 12/2014 |
| CN | 205408108 U | 7/2016 |
| CN | 106454579 A | 2/2017 |
| JP | 2006258393 A | 9/2006 |
| KR | 20160055640 A | 5/2016 |
| TW | 201540080 A | 10/2015 |
| WO | WO-2009018677 A1 | 2/2009 |
| WO | 2010/009636 A1 | 1/2010 |
| WO | WO2011085392 A1 | 7/2011 |
| WO | 2012/058886 A1 | 5/2012 |
| WO | 2012/162140 A2 | 11/2012 |
| WO | WO2016148316 A1 | 9/2016 |

* cited by examiner

HEAD MOUNTED TEMPERATURE CONTROLLED UNITS

BACKGROUND

Head mounted units (HMU) mount on a users head where the head supports the weight of the HMU and contacts the skin and hair of the user. HMUs may be utilized to provide sensory information to a user including visual images and sounds. Additionally, HMUs may be utilized for occupational assistance applications.

DETAILED DESCRIPTION

Head mounted units (HMUs), including audio headsets, virtual reality headsets, augmented reality headsets and mixed reality headsets, often include a padded sealed enclosure coupled to the HMU. The sealed enclosure directs a sensory input to a wearer and restricts ambient interference for comfort as well as to suppress ambient noise from reaching the user's eyes and ears. The padded sealed enclosure often acts as an insulator, capturing body heat released from the users head. The captured heat may become uncomfortable during prolonged usage. By utilizing heat conductive materials to replace the insulators in the padded sealed enclosures with coupled thermo-electric units, provide user control over retained body heat in a HMU. Described herein are head mounted controlled thermo-electric units.

Figure 1A:
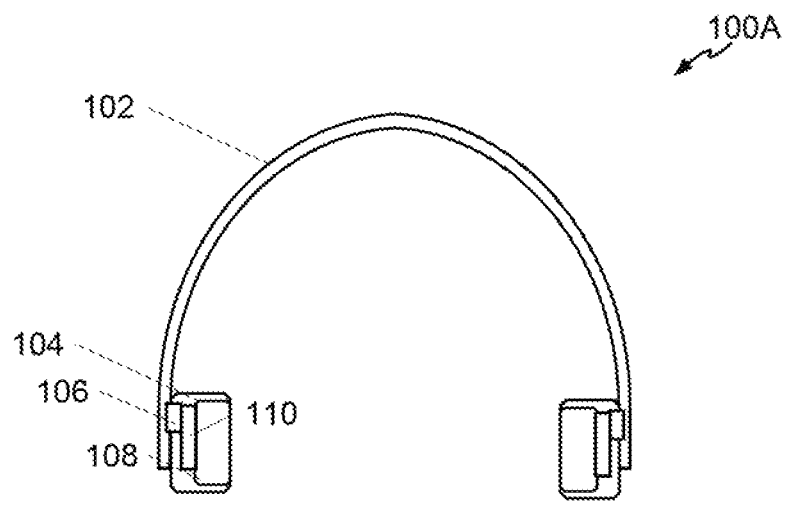
FIGS. 1A and 1B are illustrations of a head mounted temperature-controlled units according to an example.
Figure 1B:
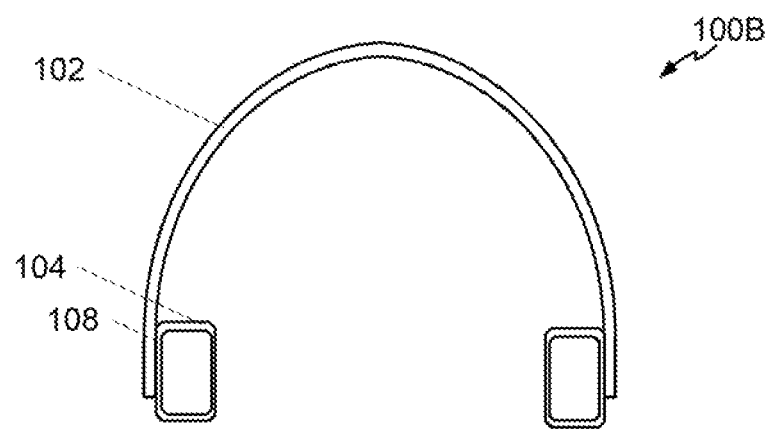

FIGS. 1A and 1B are illustrations of a head mounted temperature controlled units according to an example. A HMU 102 may include an attached sealed enclosure 104 and a thermo-electric cooling device 106.

As illustrated in FIG. 1A the HMU 102 may take the form of an audio headset 100A. The HMU 102 may also take the form of a head-mounted display when utilized for virtual, augmented, and mixed reality implementations. The HMU 102 may provide the structure to support and hold the sealed enclosure 104 and the thermo-electric cooling device 106 to a user's head. In one implementation, the HMU 102 may hold the sealed enclosure 104 around a user's ear. In another implementation, the HMU 102 may hold the sealed enclosure 104 around a user's eyes. In another implementation the HMU may hold multiple sealed enclosures 104 against a user's eyes and ears for a fully immersive experience. The sealed enclosure 104 may be shaped appropriately for the sensory organs targeted such as eyes and ears. The accompanying components may also be arranged in a way to remediate any sensory interference from the accompanying components.

The sealed enclosure 104 may provide a "cup" surrounding the sensory organ. The sealed enclosure 104 may direct sensory input, such as audio and video, to the respective sensory organ. Additionally, the sealed enclosure 104 may restrict ambient sensory input, such as room noise and lighting, from interfering with the directed sensory input. The sealed enclosure 104 may be an earcup, a virtual, reality display system, or an augmented reality display system.

A thermo-electric cooling device 106 may be utilized to move heat from within the sealed enclosure 104. A thermo-electric device 106 may utilize the Peltier effect to transfer heat from one side of the device to the other. In one implementation, heat is transferred from within the sealed enclosure 104 to an exterior of the sealed enclosure via the thermoelectric device 106. Alternatively, by reversing the polarity of the applied voltage, the thermo-electric device 106 may transfer heat from outside the sealed enclosure 104 to inside the sealed enclosure.

The thermoelectric cooling device 106 may be coupled to a thermally conductive plate 110. The thermally conductive plate 110 may be utilized to effectuate heat transfer within the sealed enclosure. The thermally conductive plate 110 may be coupled to a thermally conductive internal assembly 108. The thermally conductive plate 110 is described in detail in reference to FIG. 2 and the thermally conductive internal assembly 108 is described in detail with FIGS. 3A-3E.

As illustrated in FIG. 1B the HMU 102 may take the form of an audio headset 100B. An example of the HMU 102 illustrated in FIG. 1B may include a passive temperature controlled unit. Internal to the sealed enclosure 104 may be a thermally conductive internal assembly 108. The thermally conductive internal assembly 108 may provide heat transfer away from the contact point of the user and the sealed enclosure utilizing the properties of the materials selected. In one implementation, the HMU 102 may omit a thermo-electric cooling device 106, to provide a passive cooling experience, wherein the properties of the thermally conductive internal assembly 108 move heat alone. In another implementation, the combination of the thermally conductive internal assembly 108 and the thermoelectric cooling device 106 may provide the user a measure of control over the temperature of the sealed enclosures 104 of the HMU 102. The internals and construction of the thermally conductive internal assembly 108 is described in detail in reference to FIGS. 3A-3E.

Figure 2:
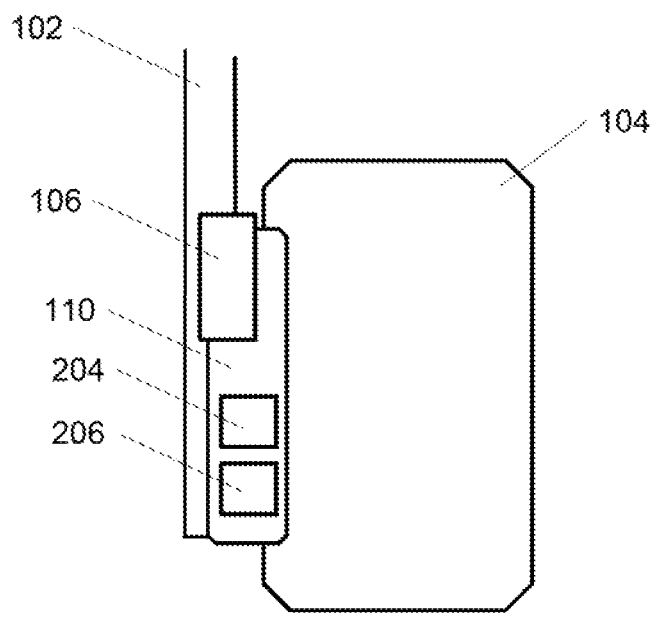
FIG. 2 illustrates a sealed enclosure of head mounted thermoelectric units according to an example.

FIG. 2 illustrates a sealed enclosure 104 of head mounted thermo-electric units according to an example. As described previously HMU 102 provides physical support for the other parts of the head mounted controlled unit. A sealed enclosure 104 may provide additional components for the presentation of sensory input to the user's sensory organs. The additional components may include but are not limited to speakers for audio sensory input and displays for visual sensory input. As described previously, the sealed enclosure 104 may provide sensory insulation from ambient aspects of the exterior environment.

The thermo-electric cooling device 106 may be attached to the sealed enclosure 104. A thermally conductive plate 110 may be utilized to facilitate heat transfer over a larger area within the interior of the sealed enclosure 104. The thermo-electric cooling device 106 may be connected to the thermally conductive plate 110 where both thermally conductive surfaces of each come into contact with one another. In some implementations, the thermally conductive plate 110 and the thermoelectric cooling device 106 may utilize a thermally conductive paste or thermal interface material to provide a path for heat to flow between them. The thermally conductive plate 110 may be formed to the shape of the interior of the sealed enclosure 104. Alternatively, the thermally conductive plate 110 may be formed and arranged to provide less interference of the sensory input reaching the sensory organ of the user. For example, the thermally conductive plate 110 may include a series of holes to allow sound to pass in an audio headset implementation. The thermally conductive plate 110 may only form the perimeter of the HMD, allowing for a greater transfer of sensory input to the sensory organ of the user. A VR, AR or MR headset may benefit for an implementation utilizing the perimeter approach.

A sensor 204 communicatively connected to a controller 206 may be utilized in conjunction with the thermoelectric cooling device 106 and the thermally conductive plate 110 to provide control for the thermoelectric cooling device 106. The sensor 204 may be mounted to the thermally conductive plate 110 to provide the controller 206 with accurate measurements of the temperature of the thermally conductive plate. The sensor 204 may be any sensor that can be utilized for measuring temperatures of the thermally conductive plate 110 including but not limited to thermistors, thermocouples, resistance thermometers, and silicon bandgap temperature sensors.

The controller 206 may be communicatively coupled to the sensor 204 and the thermoelectric cooling device 106. The controller 206 may provide the computational functionality to receive a temperature reading from the sensor 204, compare the temperature reading to a predetermined temperature, and calculate a delta between the temperature reading and the predetermined temperature. The controller 206 may factor constants or functional changes to the delta based on known temperature differences between the sensor 204 and the internal void of the sealed enclosure 104. For example, a temperature reading of 39.5 degrees Celsius at the sensor 204 corresponds to a temperature of 40.5 degrees Celsius internal to the void of the sealed enclosure. The controller 206 may deactivate the thermo-electric cooling device 106 once the delta has exceeded a threshold. In one example, the predetermined temperature may be equal to 38 degrees Celsius. A temperature reading may indicate a temperature of 36 degrees Celsius. In this example the delta would be 2 degrees Celsius. A threshold of zero may indicate to the controller 206 to deactivate the thermo-electric device, as the delta is greater than the threshold. The controller 206 may reverse the polarity of the applied voltage supplied to the thermo-electric cooling device 106. By the reversal of the polarity of the applied voltage, the thermo-electric cooling device 106 may transfer heat into the sealed enclosure 104, through the thermally conductive plate 110. The controller 206 may receive instructions from an external system. The instructions may correspond to providing the predetermined temperature as well as the threshold. The predetermined temperature and the threshold may be a part of a user preference profile which may be crafted by the user to meet their specific needs. Alternatively, the predetermined temperature and threshold may be a part of a software package designed to provide temperature control for an immersive experience. Examples of software packages providing immersive experiences may include video games, virtual or mixed reality applications, and video players.

Figure 3A:
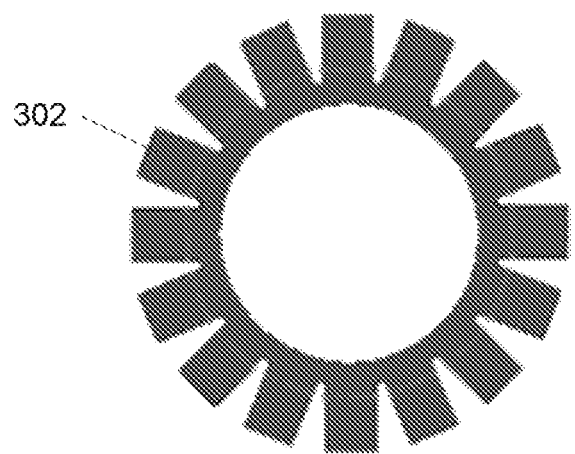
FIGS. 3A-3E illustrates the composition of a sealed enclosure of head mounted thermo-electric units according to an example.
Figure 3B:
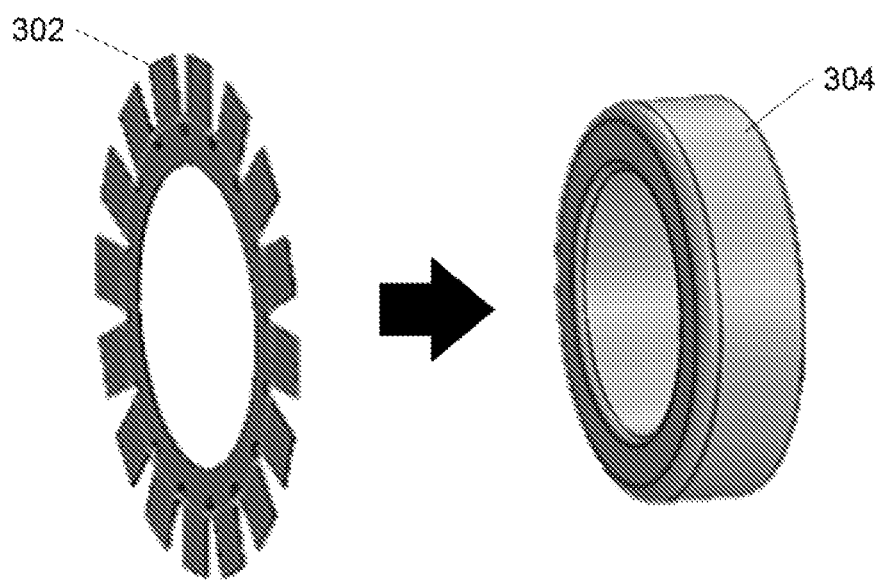

FIGS. 3A-3E illustrates the assembly of a sealed enclosure of head mounted thermo-electric units according to an example. FIG. 3A is an illustration of a thermally conductive fabric 302. The thermally conductive fabric 302 may be constructed of a graphite sheet. The thermally conductive fabric 302 may be lightweight, flexible and have high thermally conductive properties. The thermally conductive fabric 302 may include heat spreading capabilities. The thermally conductive fabric 302 may be cut from a larger thermally conductive fabric cloth or may be constructed wholly for the purpose of implementation in the sealed enclosure 104 of a HMU. In one implementation, the thermally conductive fabric 302 may be cut from a larger thermally conductive fabric cloth. The thermally conductive fabric 302 may be cut to provide full three-dimensional coverage of the sealed enclosure 104.

Figure 3C:
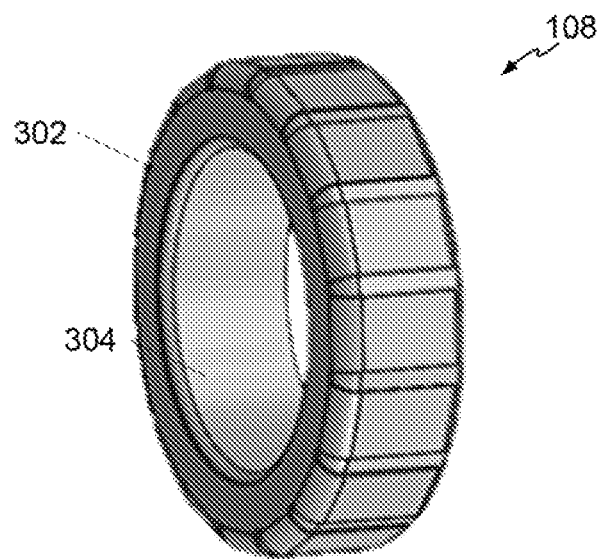

Turning to FIGS. 36 and 3C, the thermally conductive fabric 302 may be applied to a thermally conductive padding 304. The thermally conductive fabric 302 may be applied to the thermally conductive padding 304 by adherence with an adhesive. The thermally conductive padding 304 may include but not be limited to viscous silicone gel padding materials suitable for heat transfer. Additionally, the thermally conductive padding 304 may provide padding to the sensory organ to which the HMU contacts. Alternatively, the thermally conductive padding 304 may include a non-thermally conductive core padding (e.g. foam) wrapped in the thermally conductive fabric 302, thereby augmenting the non-thermally conductive core padding to conduct heat. As shown in FIG. 3C, the adherence of the thermally conductive fabric 302 to the thermally conductive padding 304 creates a thermally conductive internal assembly 108. The thermally conductive internal assembly 108 may move thermal energy. In a passive implementation, the thermally conductive internal assembly 108 may move thermal energy from the void of the sealed enclosure 104 to the exterior of the sealed enclosure, based on the thermally conductive properties of the thermally conductive fabric 302 and the thermally conductive padding 304. In an active cooling implementation, the thermally conductive properties of the thermally conductive internal assembly 108 accelerate the movement of thermal energy from the thermo-electric cooling device 106 through the thermally conductive plate 110. Alternatively the thermally conductive fabric 302 may be applied to traditional insular padding to transfer heat around and away from the padding.

Figure 3D:
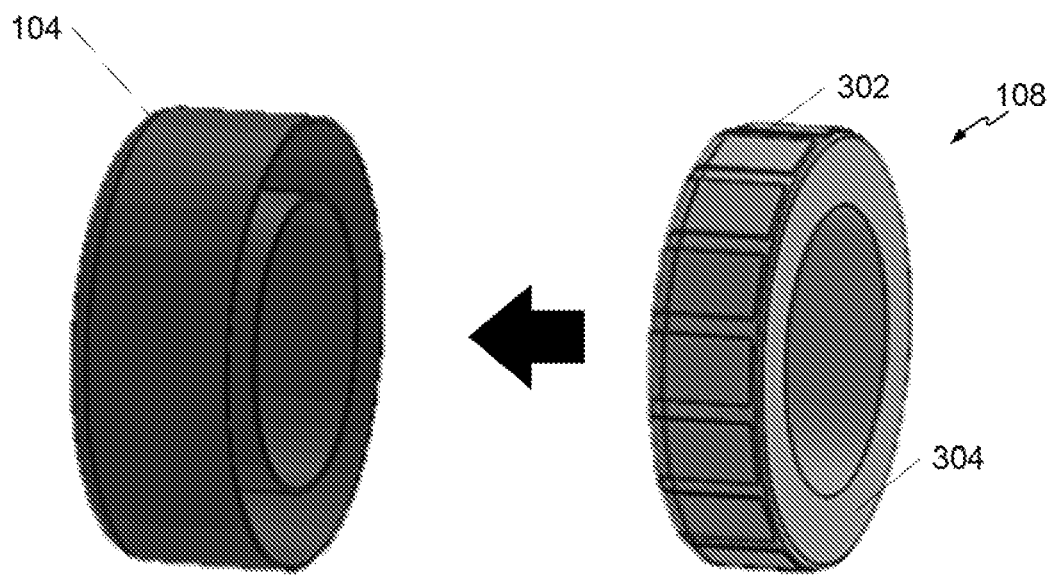
Figure 3E:
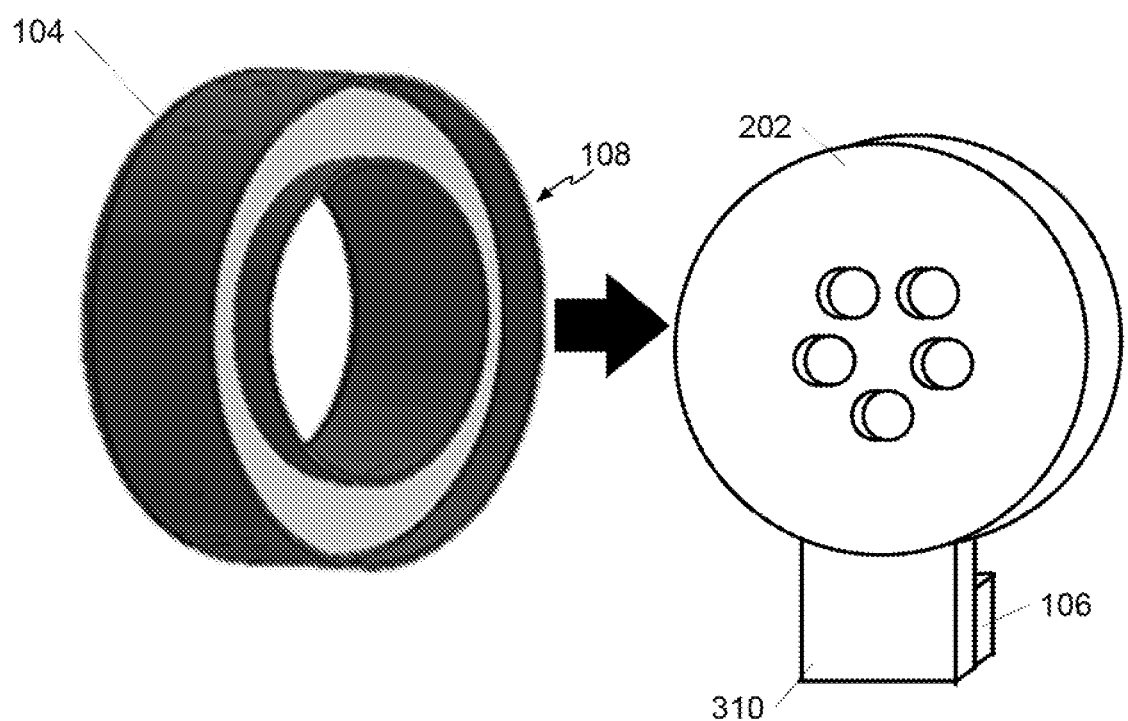

In FIG. 3D, in an assembled state, the sealed enclosure 104 may take on a hollow toroidal form. Internal to the ring of the torus, the thermally conductive internal assembly 108 may be inserted. The sealed enclosure 104 may provide structure and protection for the thermally conductive internal assembly 108. Turning to FIG. 3E, the assembled sealed enclosure 104 is illustrated. The exposed thermally conductive internal assembly 108 may be attached to the thermally conductive plate 110. By attaching the exposed thermally conductive internal assembly 108 to the thermally conductive plate 110 may allow for better transfer of thermal energy. Alternatively, the thermally conductive padding 304 may be coupled to sealed enclosure 104. In one example, the thermally conductive plate 110 may have a stem 310. The stem 310 may allow for the mounting of the thermo-electric cooling device 106 exterior to the sealed enclosure 104. By mounting the thermo-electric cooling device 106 exterior to the sealed enclosure 104, the HMU may move heat farther away from the user.

Figure 4:
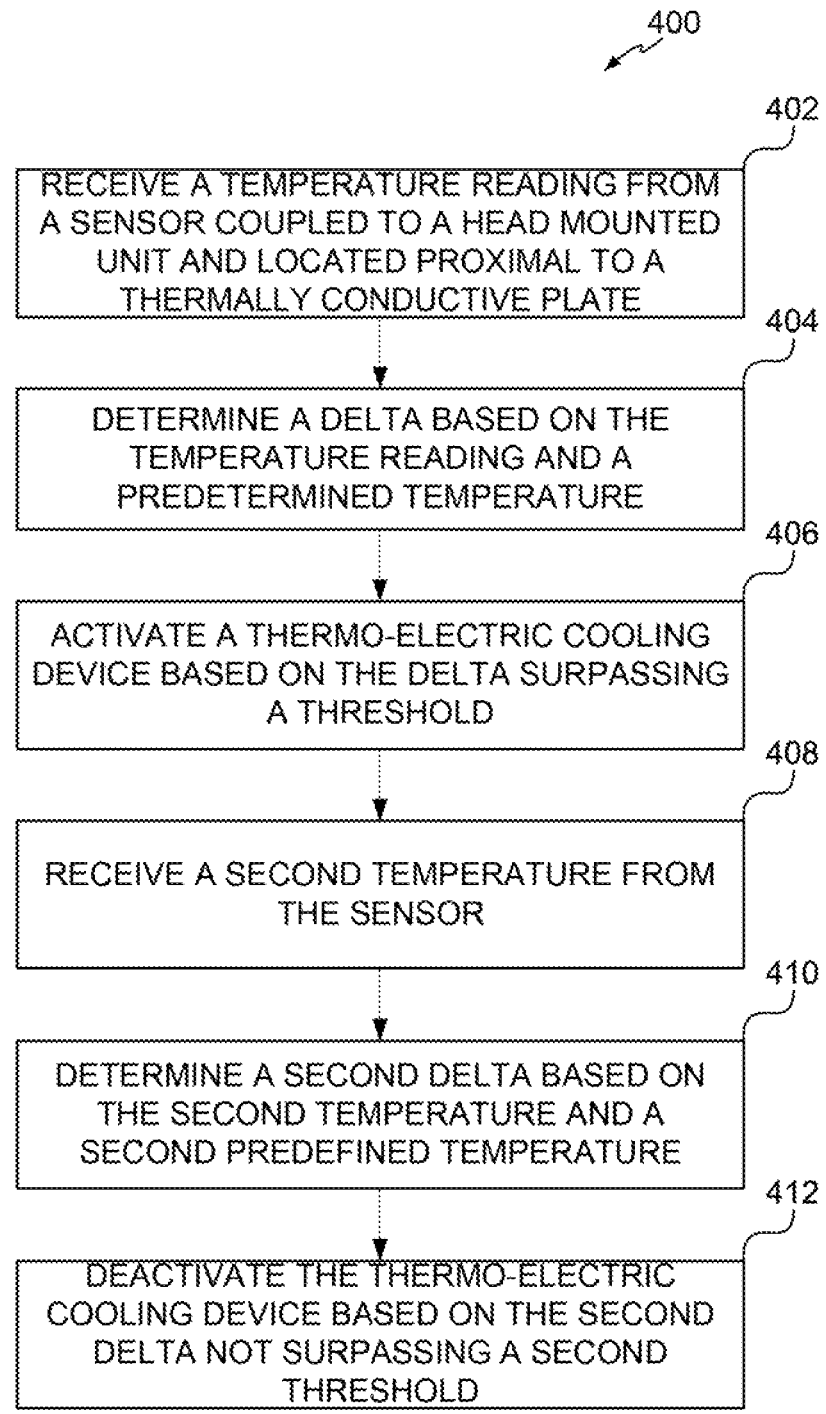
FIG. 4 is a flow diagram illustrating a method to activate head mounted thermo-electric units in accordance with an example of the present disclosure.

FIG. 4 is a flow diagram illustrating a method at a computing device to control condensation in headsets, according to an example. At step 402, a controller 206 receives a temperature reading from a sensor 204 coupled to the head mounted unit. The sensor may be located proximal to a thermally conductive plate. The thermally conductive plate may be coupled to the thereto-electric cooling device 106. The controller 206 may request or directly access the sensor 204 for a temperature reading.

At step 404, the controller 206 determines a delta based on the temperature reading and a predetermined temperature. The predefined temperature may be a maximum comfort level temperature for a user. The predefined temperature may be defined or input as a preference profile by the user. The delta may be a difference between the predetermined temperature and the temperature reading.

At step 406, the controller activates a thermo-electric cooling device based on the delta surpassing a threshold. In some implementations, the threshold provides the controller 206 a margin of error for allowing minor fluctuations within the temperature reading. The controller 206 may activate the thermo-electric cooling device 106 by applying voltage directly to the thermo-electric cooling device, or by signaling a subsystem of the thermo-electric cooling device to activate the thermo-electric cooling device.

At step 406, the controller receives a second temperature from the sensor. The controller 106 may poll the sensor for a second and additional temperature readings. The second and additional temperature readings may correspond to temperatures inside the sealed enclosure proximal to the thermally conductive plate which is connected to the thermo-electric cooling device. The second and additional temperature readings may fluctuate during the time of use of the HMU 102.

At step 410, the controller determines a second delta based on the second temperature and a second predefined temperature. The controller compares the second temperature from a second predefined temperature. In one implementation the second predefined temperature may be a floor value corresponding to a "cold tolerance" of the user. The second delta may be a difference between the second temperature and the second predefined temperature.

At step 412, the controller deactivates the thermo-electric cooling device based on the second delta not surpassing a second threshold. In one embodiment, if the second delta does not surpass the second threshold, the HMU at the thermally conductive plate, may be too cold for the user. Thus, the controller may deactivate the thermo-electric cooling device.

Alternatively, the controller 206 may receive a second temperature reading. Similar to the receiving at step 402, the controller 206 may interface with the sensor 204 to receive another temperature reading. The controller 206 may determine a second delta based on the second temperature reading and a second predetermined temperature. The controller may deactivate the thereto-electric cooling device 106 based on the second delta surpassing a threshold. Similar to the activation described in reference to step 406, the deactivation may be utilized to turn off the thermo-electric cooling device 106 in the event that the second temperature reading indicates that the thermo-electric cooling device 106 has exceeded the threshold. In one implementation, the deactivation of the thermo-electric cooling device 106 may be in response to a temperature reading indicative that the sealed enclosure has gotten colder than the user's preference profile. In another implementation, where the polarity of the applied voltage has been reversed, the thereto-electric cooling device 106 may have gotten warmer than the users preference profile.

Figure 5:
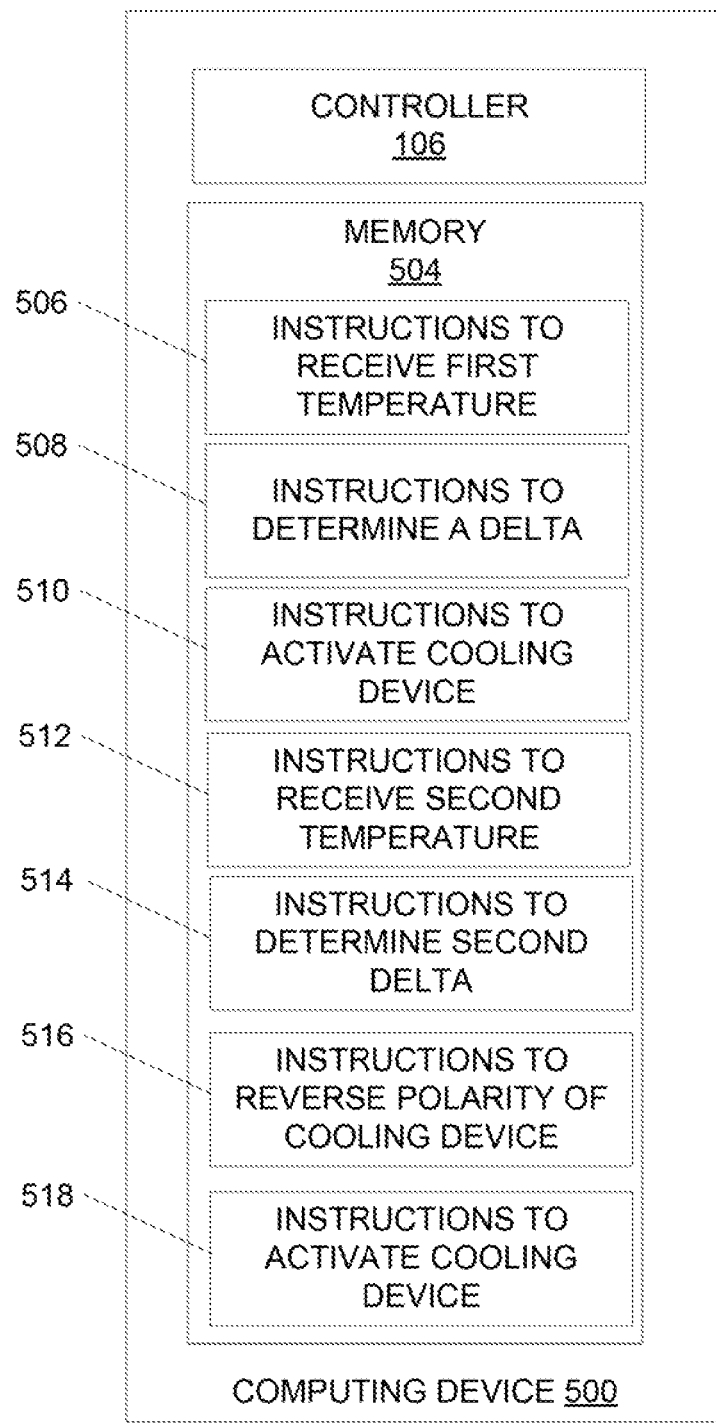
FIG. 5 is a block diagram illustrating a computing device to activate head mounted thermoelectric units, according to an example.

FIG. 5 is a block diagram illustrating a computing device to activate head mounted thermo-electric units, according to an example. The computing device 500 depicts a controller 106 and a memory device 604 and, as an example of the computing device 500 performing its operations, the memory device 504 may include instructions 506-516 that are executable by the controller 106. Thus, memory device 504 can be said to store program instructions that, when executed by controller 106, implement the components of the computing device 500. The executable program instructions stored in the memory device 504 include, as an example, instructions to receive temperature 506, instructions to determine a delta 508, instructions to activate a cooling device 510, instructions to receive a second temperature 512, instructions to determine a second delta 514, instruction to reverse the polarity of the cooling device 516, and instructions to activate the cooling device 516.

Memory device 504 represents generally any number of memory components capable of storing instructions that can be executed by controller 106. Memory device 504 is non-transitory in the sense that it does not encompass a transitory signal but instead is made up of at least one memory component configured to store the relevant instructions. As a result, the memory device 504 may be a non-transitory computer-readable storage medium. Memory device 504 may be implemented in a single device or distributed across devices. Likewise, controller 106 represents any number of processors capable of executing instructions stored by memory device 504. Controller 106 may be integrated in a single device or distributed across devices. Further, memory device 504 may be fully or partially integrated in the same device as controller 106, or it may be separate but accessible to that device and controller 106.

In one example, the program instructions 506-518 can be part of an installation package that when installed can be executed by controller 106 to implement the components of the computing device 500. In this case, memory device 504 may be a portable medium such as a CD, DVD, or flash drive or a memory maintained by a server from which the installation package can be downloaded and installed. In another example, the program instructions may be part of an application or applications already installed. Here, memory device 504 can include integrated memory such as a hard drive, solid state drive, or the like.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means, that a particular feature, structure, or characteristic described in connection with the example is included in at least one example, but not necessarily in other examples. The venous instances of the phrase "in one example" or similar phrases in various places in the specification are not necessarily ail referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the scope of the disclosure. Thus, the present disclosure is not intended to be limited to the examples shown herein but is to be accorded the widest scope consistent with the principles and novel features disclosed herein.

What is claimed is:

1. An apparatus comprising:
   a head mounted unit;

a sealed enclosure coupled to the head mounted unit, wherein the sealed enclosure directs a sensory input to a wear and restricts ambient interference;
a thermally conductive padding coupled to the sealed enclosure; and
a thermally conductive fabric covering an exterior of the thermally conductive padding, wherein the thermally conductive fabric contacts a user.

2. The apparatus of claim 1, further comprising:
a thermo-electric cooling device coupled to the head mounted unit;
a thermal conductive plate coupled to the thermoelectric cooling device and the sealed enclosure, wherein the thermal conductive plate transfers thermal energy;
a sensor coupled to the head mounted unit;
a controller, electrically coupled to the thermo-electric cooling device, configured to:
receive a temperature reading;
determine a delta based on the temperature reading and a predetermined temperature; and
activate the thermo-electric cooling device based on the delta surpassing a threshold.

3. The apparatus of claim 2, wherein the predetermined temperature comprises a maximum comfort level temperature provided by the user.

4. The apparatus of claim 1, wherein the thermal conductive padding comprises viscous silicone gel.

5. The apparatus of claim 1, wherein the sealed enclosure comprises one from the group of an earcup, a virtual reality display system, and an augmented reality display system.

6. A computing device comprising:
a memory having instructions stored thereon and
a controller configured to perform, when executing the instructions to:
receive a temperature reading from a sensor coupled to a head mounted unit;
determine a delta based on the temperature reading and a predetermined temperature, wherein the temperature reading corresponds to a temperature internal to a sealed enclosure coupled to the head mounted unit;
activate a thermoelectric cooling device based on the delta surpassing a threshold, wherein the thermo-electric cooling device is coupled to the sealed enclosure,
receive a second temperature reading from the sensor;
determine a second delta based on the second temperature reading and a second predetermined temperature;
reverse the polarity of the thermo-electric cooling device; and
activate the thermo-electric cooling device based on the second delta not surpassing a second threshold.

7. The computing device of claim 6, wherein the second predetermined temperature comprises a minimum comfort level temperature provided by the wearer.

8. The computing device of claim 6, wherein the predetermined temperature comprises a maximum comfort level temperature provided by the wearer.

9. The computing device of claim 8, wherein the sealed enclosure comprises one from the group of an earcup, a virtual reality display system, and an augmented reality display system.

10. The computing device of claim 9, wherein the sealed enclosure comprises a thermal conductive padding coupled to the head mounted unit.

11. A method comprising:
receiving a temperature reading from a sensor coupled to a head mounted unit and located proximal to a thermally conductive plate;
determining a delta based on the temperature reading and a predetermined temperature, wherein the temperature reading corresponds to a temperature internal to a sealed enclosure coupled to the head mounted unit;
activating a thermo-electric cooling device based on the delta surpassing a threshold, wherein the thermo-electric cooling device is coupled to the coupled to the thermally conductive plate;
receiving a second temperature reading from the sensor;
determining a second delta based on the second temperature reading and a second predetermined temperature; and
deactivating the thermo-electric cooling device based on the second delta not surpassing a second threshold.

12. The method of claim 11, wherein thermally conductive padding coupled to the sealed enclosure.

13. The method of claim 12, wherein the thermally conductive padding comprises a non-thermally conductive core padding wrapped in a thermally conductive fabric.

14. The method of claim 11, wherein the sealed enclosure comprises one from the group of an earcup, a virtual reality display system, and an augmented reality display system.

15. The method of claim 11, wherein the predetermined temperature comprises a maximum comfort level temperature provided by the wearer.

* * * * *